United States Patent [19]
Gordon

[11] Patent Number: 5,363,746
[45] Date of Patent: Nov. 15, 1994

[54] AUTOMATIC FOOD PREPARATION DEVICE

[76] Inventor: Ellis D. Gordon, c/o Cygnus Appliance Corporation ISIS Center, ISU Research Park, 2501 N. Loop Dr., Ames, Iowa 50010

[21] Appl. No.: 988,349

[22] Filed: Dec. 9, 1992

Related U.S. Application Data

[63] Continuation of Ser. No. 605,177, Oct. 29, 1990, abandoned.

[51] Int. Cl.$^5$ .......................... A23C 9/00; A23G 9/00; A47J 27/00; B01F 15/06
[52] U.S. Cl. .......................... 99/328; 62/342; 99/348; 99/455; 99/468; 99/470; 366/145; 366/146; 366/149; 366/601
[58] Field of Search .................. 99/331–334, 99/326–328, 352, 353, 357, 455, 348, 468, 470; 366/144–146, 149, 601, 98, 342; 62/342

[56] References Cited

U.S. PATENT DOCUMENTS

| | | |
|---|---|---|
| 594,533 | 11/1897 | Henius . |
| 934,972 | 9/1909 | Jewell . |
| 1,533,865 | 4/1925 | Jones et al. . |
| 2,025,757 | 12/1935 | Lindsey . |
| 2,043,190 | 6/1936 | Carpenter . |
| 2,265,552 | 12/1941 | Sticelber . |
| 2,266,983 | 12/1941 | Money . |
| 2,504,794 | 4/1950 | Berman et al. ........................ 257/3 |
| 2,575,922 | 11/1951 | Langenwalter . |
| 2,616,270 | 11/1952 | Field . |
| 3,045,980 | 7/1962 | Isham . |
| 3,225,820 | 12/1965 | Riordan . |
| 3,323,320 | 6/1967 | Conz . |
| 3,338,100 | 8/1967 | Takami . |
| 3,452,555 | 7/1969 | Thurman et al. . |
| 3,463,224 | 8/1969 | Myers . |
| 3,516,485 | 6/1970 | Rhoads et al. ........................ 165/27 |
| 3,952,538 | 4/1976 | Warlick . |
| 4,048,473 | 9/1977 | Burkhart . |
| 4,070,957 | 1/1978 | Korekawa et al. . |
| 4,429,549 | 2/1984 | Randolphi . |
| 4,463,572 | 8/1984 | Brown, Jr. . |
| 4,535,604 | 8/1985 | Cavalli . |
| 4,538,427 | 9/1985 | Cavalli . |
| 4,538,509 | 9/1985 | Ojima et al. ........................ 99/352 |
| 4,551,025 | 11/1985 | Ames et al. . |
| 4,563,880 | 1/1986 | Cipelletti . |
| 4,573,329 | 3/1986 | Cavalli . |
| 4,649,810 | 3/1987 | Wong ........................ 99/326 |
| 4,664,529 | 5/1987 | Cavalli ........................ 366/144 |
| 4,681,458 | 7/1987 | Cavilli . |
| 4,693,610 | 9/1987 | Weiss ........................ 99/348 |
| 4,704,035 | 11/1987 | Kowalczyk . |
| 4,712,920 | 12/1987 | Ames et al. . |
| 4,715,723 | 12/1987 | Anderson et al. . |
| 4,762,057 | 8/1988 | Hirota et al. ........................ 99/468 |
| 4,772,777 | 9/1988 | Weller et al. . |
| 4,773,233 | 9/1988 | Kawasumi et al. . |
| 4,776,265 | 10/1988 | Ojima ........................ 99/468 |
| 4,802,407 | 2/1989 | Negri et al. ........................ 99/453 |
| 4,827,732 | 5/1989 | Suyama et al. . |
| 4,838,702 | 6/1989 | Torimitsu et al. . |
| 4,880,954 | 11/1989 | Bennett et al. . |
| 4,884,626 | 12/1989 | Filipowski . |
| 4,903,588 | 2/1990 | Horiuchi et al. ........................ 366/146 |
| 4,903,589 | 2/1990 | Aoyama ........................ 99/331 |

OTHER PUBLICATIONS

Article from "Appliance Manufacturer", Jul. 1988; p. 49; entitled: U.S. Innovativeness, date unknown.
"Cole–Parmer Polystat Circulator Baths"; pp. 4–7, date unknown.
Article on "National Bread Bakery"; p. 62; and Article on the "DAK Auto Bakery"; pp. 20–22.
Article entitled "Opting For The Extras" of Cooks's magazine; p. 52; 1990.

*Primary Examiner*—Timothy F. Simone
*Attorney, Agent, or Firm*—David Fink

[57] ABSTRACT

A kitchen appliance which enables automatic preparation of desserts or other food products according to instructions pre-programmed into the appliance. Programmed preparation steps can include any desired sequence of heating, cooling, and mixing of ingredients placed in a detachable container of the appliance. Accessory attachments can be provided to the appliance for automatically adding recipe ingredients to the container during automatic preparation. A dispensing pump may also be provided for dispensing a heated or frozen product from the container.

28 Claims, 7 Drawing Sheets

AUTOMATIC FOOD PREPARATION DEVICE

This is a continuation of prior U.S. application Ser. No. 07/605,177 filed Oct. 29, 1990, now abandoned.

BACKGROUND OF THE INVENTION

1. Field of the Invention

The invention relates to a kitchen appliance for automated preparation of food products, especially, but not limited to, chilled desserts. This appliance can cycle through heating, refrigeration, freezing and mixing functions without having to remove a detachable container from the machine. All appliance functions are controlled by a powerful programmable computer circuit located internally in the device. Food products that can be prepared and stored in the automatic food preparation device include: ice creams, sherbets, soft yogurts, jellos, puddings, custards, milk shakes, sorbets, frappes, frozen juices, mousses, souffles, jams and jellies, soft baby foods, poached fruits, chilled soups, cranberry and blueberry salads, gelatin salads, pasta sauces, seafood sauces, poultry sauces, hollandaise sauce, bernaise sauce, gravy, chili, stews, scrambled eggs, wild rice salads, waldorf salads, potato salad, crab and shrimp salad, hot cereals, deep fried foods, popcorn, pie crust, bread dough, doughnut dough, pizza dough, chocolate candy, fudge, cake frostings, pie fillings, and food products requiring pasteurization.

2. Background of the Related Art

In the past, kitchen appliances have been designed to perform one or more of the functions of heating, cooling, and mixing. For example, several companies produce automatic breadmakers which both knead and bake bread. The American Gas Association is developing a gas tabletop oven that is capable of both heating and cooling. However, a single appliance has not been developed which permits automated preparation of food products involving heating, cooling, and mixing according to a programmed recipe wherein human intervention during food preparation is unnecessary or significantly minimized.

Since the early 1980's, some Italian companies such as Simac have designed ice cream makers with built-in chilling systems. U.S. Pat. Nos. 4,535,604, 4,538,427, 4,573,329, and 4,681,458 all to Cavalli, disclose ice cream making machines that perform chilling and mixing. However, none of these ice cream makers include means for heating. Appliances are generally not constructed which perform heating and cooling functions because refrigeration systems cannot withstand high temperatures. For example, low-level chemical decomposition of R-12 refrigerant begins to take place at approximately 250° F. Raising the temperature of R-12 refrigerant from 70° F. to 200° F. will result in a 500% increase in the pressure of the refrigerant. These high pressure levels in the refrigeration system can result in the failure of solder joints. High heat also increases the chance of compressor failure. Furthermore, R-12 refrigerant reaches its "critical point" at a temperature between 220° F. and 233° F. Above the "critical point", the refrigeration system ceases to function. Additionally, the efficiency of the refrigerant decreases as the "critical point" temperature is neared. Non-CFC refrigerant replacements for R-12 such as R-134A have even less chemical stability than R-12, thus producing even more of a problem with loss of refrigerant at high temperatures.

For several years, combined heating and chilling baths have been available as laboratory apparatus. The major application for these laboratory refrigerated baths is to provide direct temperature measurement and control in an external closed-loop system. Pressure and/or suction pumps located in the refrigerated bath housing circulate liquid around external laboratory apparatus, such as electrophoresis setups. One such apparatus is the Cole-Parmer TM miniature refrigerated bath available from Cole-Parmer TM Instrument Company of Chicago, Ill. The bath has a built in refrigeration compressor and further includes an immersion heating and cooling coil that extends into a stainless steel bath tank designed to hold water or a silicone bath oil. The Cole-Parmer TM miniature refrigerated bath has an operating temperature range of $-20°$ to $100°$ C. Cole-Parmer TM Instrument Company also makes the Cole-Parmer TM Polystat TM refrigerated bath, which has an operating temperature range of $-20°$ to $200°$ C.

Another type of laboratory temperature control bath is the circulator bath. This type of bath has an automatic heater and an immersion coolant circulating coil protruding into the cavity that forms the bath tank for holding water, silicone oil or another heat transfer fluid. An external chiller system can be connected to the coolant coil allowing the liquid in the bath to be chilled. A pump circulates the liquid within the bath tank and externally, if desired. The Cole-Parmer TM Polystat TM Circulator Baths are examples of this type of laboratory apparatus. These baths refrigerate indirectly through the use of an intermediate single phase fluid such as methanol or glycol. The single-phase fluid flows by pump from a refrigerated holding tank located in the external chiller through cooling coils in contact with the bath tank. This indirect chilling method is thermally inefficient since the refrigerant does not directly cool the bath. Furthermore, single-phase intermediate fluids have heat transfer coefficients that are low in comparison to two phase refrigerants such as R-12 or R-134A. The methanol or other intermediate heat transfer fluid must be chilled separately in a heat exchanger before it can cool the bath. Several thermal resistance points are created by this process. Another disadvantage of the Cole-Parmer TM circulating baths is that an external intermediate fluid holding tank, refrigeration system, heat exchanger, and pump are required for system operation. The size, weight, mechanical complexity, and manufacturing cost of the refrigeration system are increased by the added refrigeration system components. Furthermore, the Cole-Parmer TM refrigerated or circulating baths disclose no means by which recipe ingredients could be mixed within the refrigerating or heating bath. The different types of laboratory liquid temperature control baths are neither designed nor used for food processing applications. Also, the baths are not constructed so they can easily be removed from the refrigeration unit. A detachable foodstuff container is necessary for convenience and sanitation reasons. Furthermore, immersion type coils that cannot be easily removed are not suitable for use with foodstuffs. Immersion coils protruding into a container would make effective mixing of recipe ingredients difficult. Cleaning the container and coil assembly after food preparation would also be a difficult task.

Several detachable container designs for use in ice cream machines have been advanced by the Italians and Japanese. Patents 4,775,233 (Kawasumi et al) and 4,827,732 (Suyama et al) each freeze the detachable container in place, creating an ice gap between the wall of the cylindrical shaped evaporator and the container. Ice is a poor thermal conductor, thus resulting in inefficient cooling of the detachable container. To remove the detachable container from the evaporator assembly, hot gas must be channeled from the compressor back through the evaporator to melt the ice holding the container in place. This design is poor in thermal performance, expensive to manufacture, and inconvenient to the consumer. Furthermore, as in the case of all prior art ice cream machines, any heating of recipe ingredients must be done on a stove before the ingredients can be transferred to the ice cream making machine for freezing.

Evaporator designs used in prior art refrigeration devices also leave room for substantial improvements. Existing evaporator designs use thin metal construction wherein an evaporator coil is fastened to the outer wall of the evaporator assembly. The evaporator assembly is a cylindrical shaped well that accepts a detachable container. Such construction provides inferior thermal performance in comparison to the present design because only about 25% of the round coil surface actually contacts the thin metal. Additionally, prior designs could not be manufactured with precise uniformity from piece to piece because metal distortion occurred when the evaporator coil was soldered or brazed to the outer metal skin. Even a minute amount of metal distortion in these prior art devices increased thermal resistance by creating air or ice gaps. Additionally, the distortion prevented the detachable container from coupling properly with the evaporator assembly, making insertion and removal difficult.

A few prior art designs, of which Cavalli U.S. Pat. No. 4,573,329 is a typical example, made use of elastically formable evaporator assemblies to improve contact with the detachable container. With this design, a mechanical system allows the evaporator assembly to be loosened or tightened around a detachable container. Cavalli U.S. Pat. No. 4,573,329 used a series type manifold refrigerant flow tube pattern that required several connection joints using low-temperature sealant. The attachment of the complex manifold related tube network onto the outer metal wall surface of a cylindrical shaped metal surface to create an evaporator is a difficult and time consuming assembly procedure. The only practical method of attaching the tube network to the metal skin is by using thermal conductive epoxy. This creates a very large thermal resistance point, lowering potential performance. To achieve the elastically formable design, a complex mechanical system consisting of flanges, seats, pistons, pins and cams is used to loosen and tighten the evaporator around the detachable container. Springs are employed to maintain tension. Because of this design, over time and heavy usage, the contact junction with the removable container can be expected to loosen as the mechanical system weakens. Second, in conjunction with the movement related stress placed on the refrigerant flow coil connection joints as a result of the mechanical system's operation, the chance of refrigerant leaking at the connections from stress cracks is increased.

Prior art evaporator designs were also incapable of maintaining uniform temperatures throughout their evaporator coils. These designs, of which Cavalli U.S. Pat. No. 4,681,458 is a typical example, include a single coil into which cold refrigerant enters at the top. The refrigerant flowing through the coil takes on heat and leaves the base of the evaporator at a higher temperature. Since the refrigerant at the base has less capacity to carry away heat, the area being cooled will be kept colder at the top than at the bottom in the prior art devices.

As mentioned earlier, Cavalli U.S. Pat. No. 4,573,329 suggested the use of a manifold refrigerant flow network for application with elastically formable designs. This design consists of a plurality of lengths of tubing connected together in series by means of two manifold bodies spaced apart in a circumferential direction. The lengths of tubing connected to the manifold are arranged above one another in contact. This design creates an uneven flow of refrigerant through the tube network as the refrigerant pressure drops along the length of the manifold network.

SUMMARY OF THE INVENTION

It is an object of the present invention to provide a kitchen appliance which can accomplish the tasks of chilling, heating, and mixing recipe ingredients for food products according to programmable sequences of preparation steps.

It is another object of the invention to provide a heating and cooling appliance wherein the integrity of a refrigerant or the refrigeration system components used for cooling are not adversely affected when the appliance is used for heating.

It is yet another object of the invention to provide a kitchen appliance which performs heating, refrigeration, and/or mixing operations in response to either manual or preprogrammed preparations steps.

It is a further object of the invention to provide a refrigerating appliance with an evaporator having improved heat transfer characteristics so a food product can be uniformly and efficiently cooled.

The present invention provides an automated food preparation device which can chill, heat, and mix or blend food products within a container according to sequences of programmed preparation steps. The device includes a container adapted to contain a food product, and means for cooling, heating, and mixing the contents within the container. Additionally, the device includes means for automatically actuating at least one of the cooling, heating, and mixing means, whereby the food products may be automatically processed within the container.

According to one embodiment of the device, the container is of a truncated conical shape which follows the shape of an evaporator plate cooled by a refrigeration circuit. The evaporator plate serves as the means for cooling the container, and includes a refrigerant flow channel through which a refrigerant such as R-12 or R-134A flows to remove heat from the container. The means for heating the container includes a heating plate or heating element beneath the detachable container. The means for mixing the food product within the detachable container includes a rotatable shaft carrying at least one blade.

The evaporator assembly can be made shorter in length than the detachable container, reducing the amount of metal used in the evaporator's construction. The shorter length version of the evaporator is positioned around the upper length of the detachable container. This design minimizes the potential for the detachable container to stick in the evaporator assembly after insertion. Furthermore, use of this design variation lowers the cost of scaling up the volume capacity of the food processing appliance. This design works since the chilling effect of the evaporator extends below the actual evaporator due to a buoyancy effect and the mixing capabilities of the appliance.

In the preferred embodiment of the invention, mechanical means are provided for moving the detachable container between a first and second position. In the first position, the detachable container is in contact with the evaporator plate for removing heat from the detachable container. In the second position, the detachable container is elevated out of contact with the evaporator plate, such that the contents of the container can be heated without heating the refrigerant within the evaporator plate. This second position also allows the contents of the detachable container to precool by natural convection before switching to the first position. Pre-cooling a hot foodstuff for a short period reduces the load on the refrigeration system.

In a second embodiment of the invention, a secondary refrigerant such as methanol is used. Since methanol is a single phase refrigerant, its use avoids the pressure and temperature decomposition problems associated with refrigerants such as R-12 and R-134A discussed previously. Thus, in this second embodiment of the invention, a mechanical means is not required for moving the detachable container out of contact with the evaporator plate. This second embodiment of the invention, however, nonetheless includes a ventilating fan and an air channel around the detachable container for pre-cooling the container before refrigeration begins. This pre-cooling step is important to lessen the load on the refrigeration system, which otherwise would have to remove all of the heat trapped in the food product during a preceding heating step.

It should also be appreciated that alternative means for chilling, heating, and mixing could be used by the present invention. Rather than a vapor compression cycle, for example, alternative refrigeration means such as thermoelectric, Stirling Cycle, Absorbtion, Propane or thermoacoustic refrigeration could be used. Likewise, rather than a conductive heating plate, a microwave, magnetic induction or halogen heat source could be employed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings; wherein.

DETAILED DESCRIPTION OF THE PREFERRED EMBODIMENTS

Figure 1:
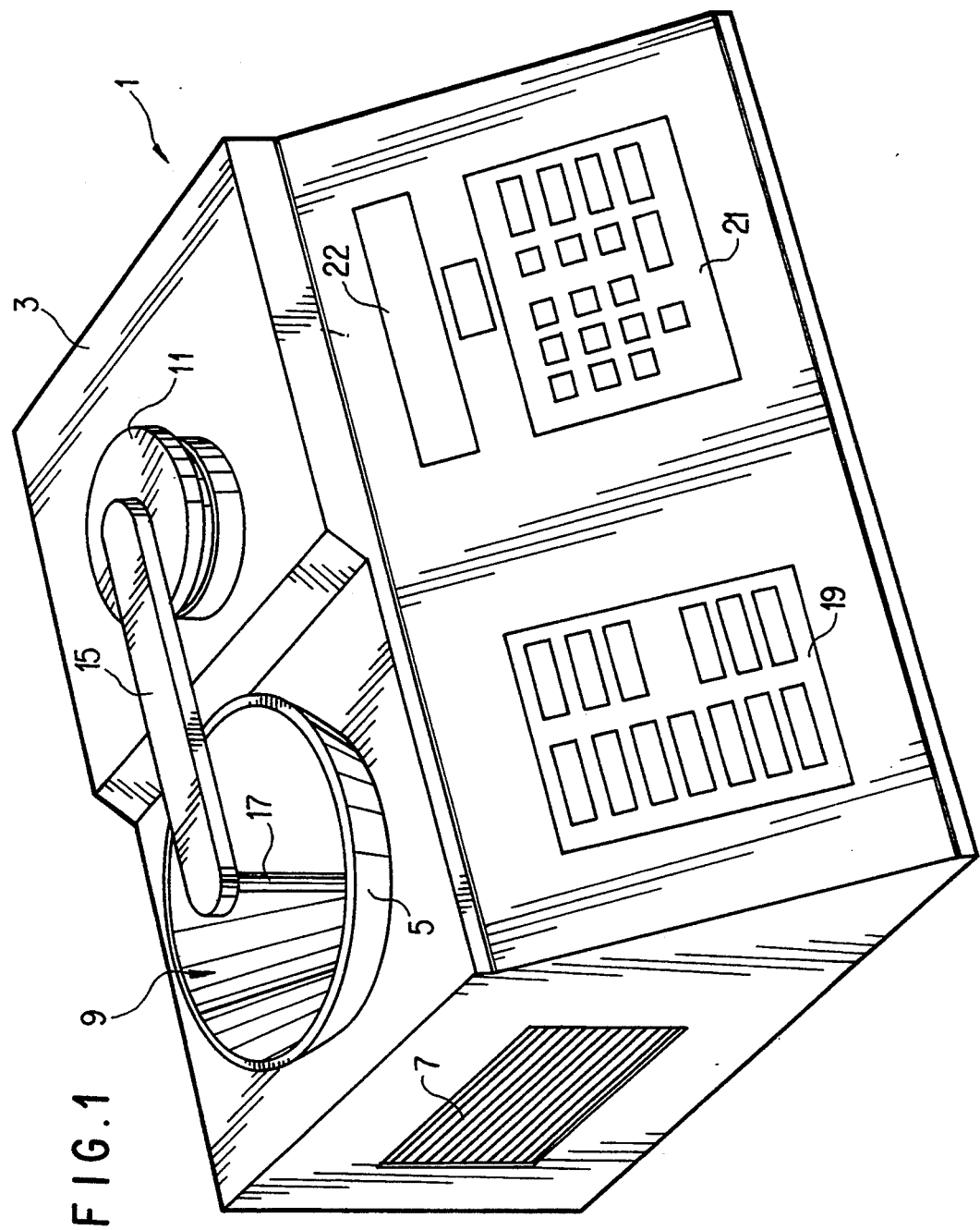
FIG. 1 is an overall orthogonal view showing the external appearance of a preferred embodiment of the food preparation device of the present invention.
Figure 2:
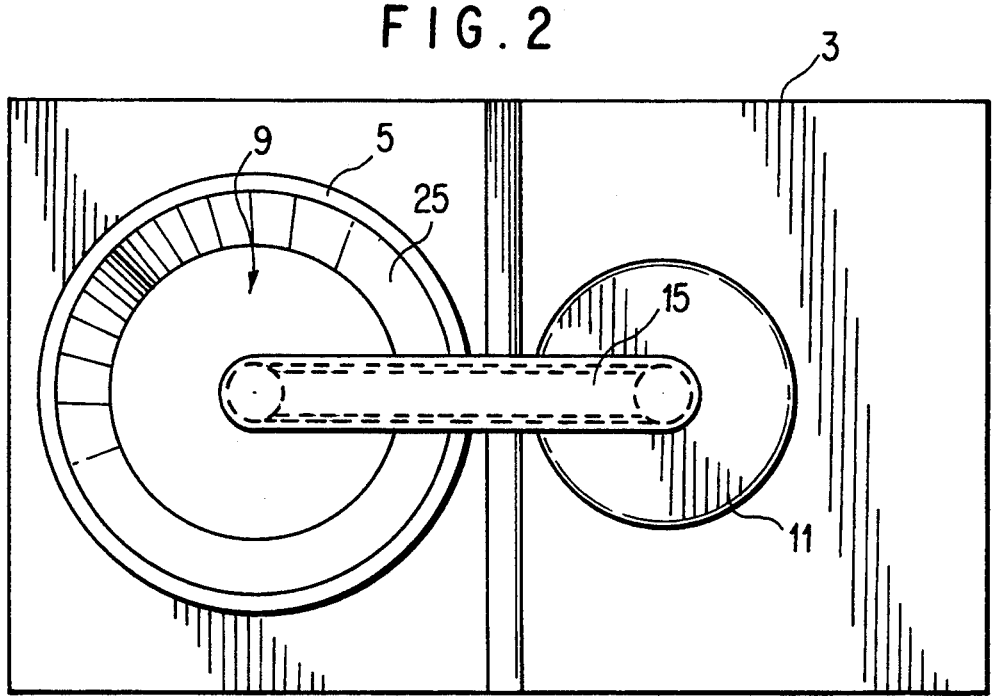
FIG. 2 is a top view of the food preparation device shown in FIG. 1.
Figure 4:
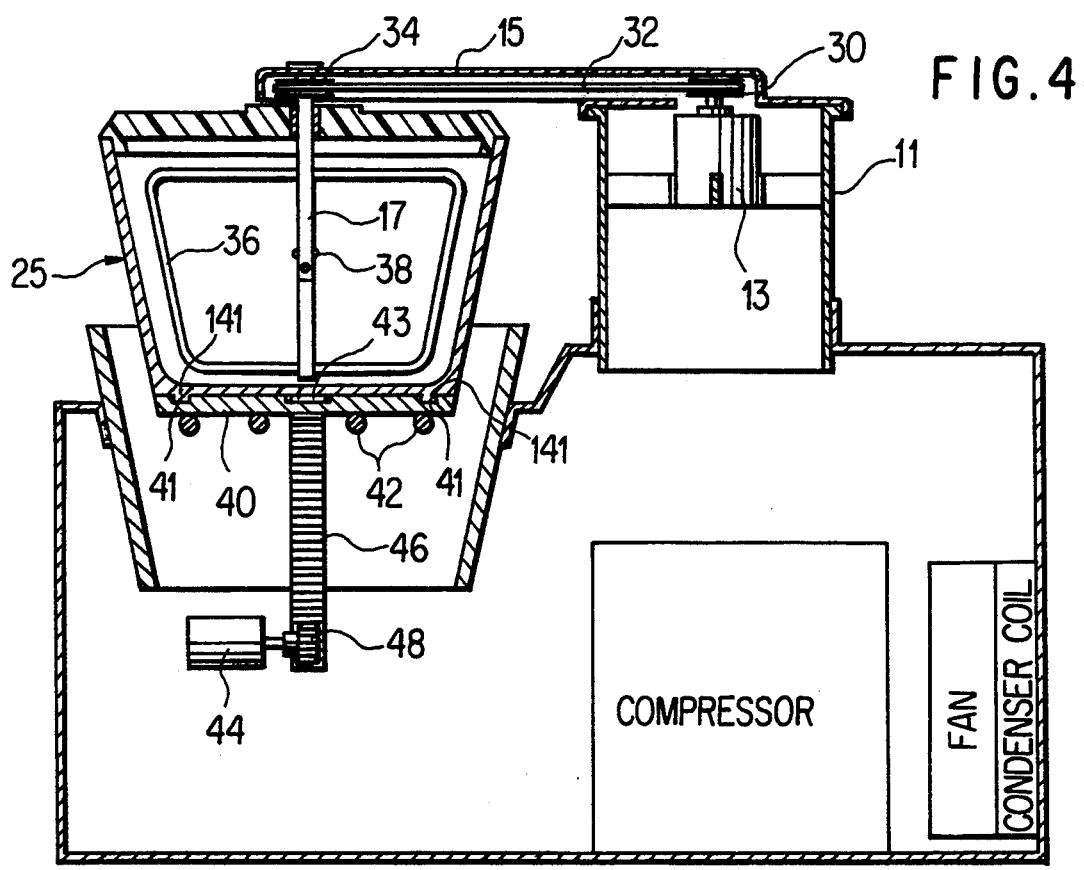
FIG. 4 is a schematic side view of the automatic food preparation device of FIG. 1 shown in its heating position.
Figure 5:
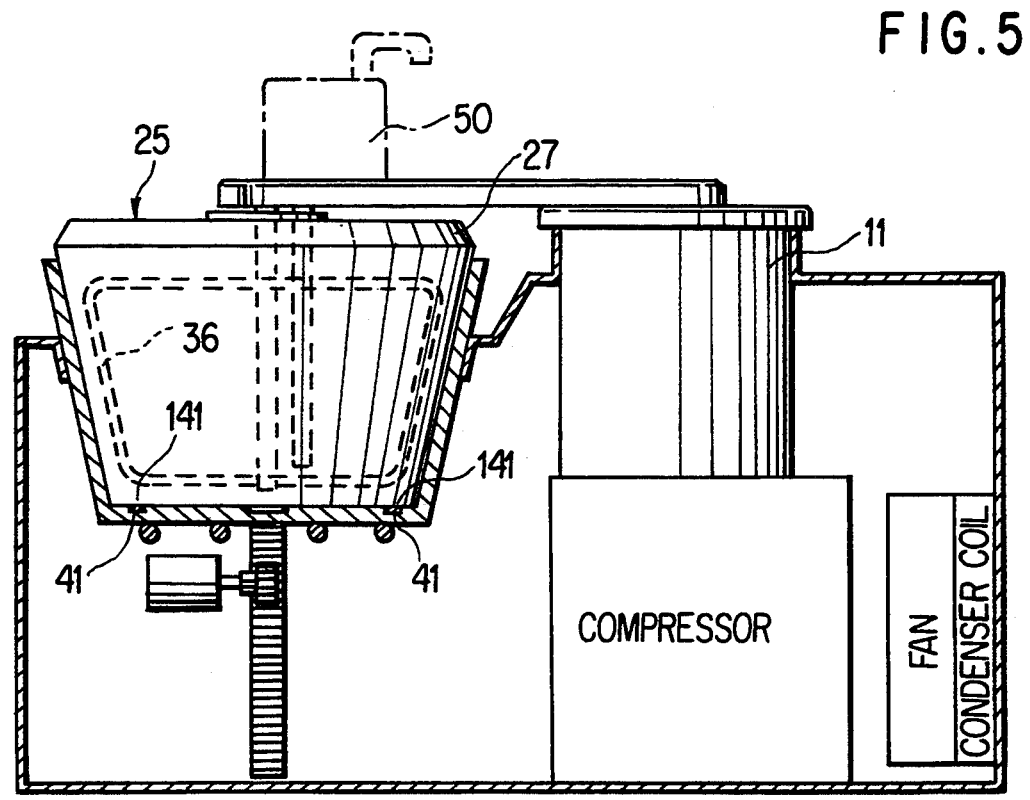
FIG. 5 is a schematic side view of the food preparation device of FIG. 1 shown in its cooling position.

In FIGS. 1 and 2, an automated food preparation device 1 includes a housing 3, an evaporation plate 5 having a refrigerant flow channel 54 (see FIG. 7), and a ventilation opening 7 through which heat is expelled from a condenser (FIGS. 4-5). A container of food to be processed is placed within a receiving space 9 in contact with evaporator plate 5. A refrigerant such as R-12, or alternatively 134A, is passed in a liquid state through evaporator plate 5, extracting heat from the food product causing the refrigerant to vaporize. The details of the construction of the evaporator will be discussed in detail later. Refrigerant in its gaseous state flows from the evaporator to the condenser (FIGS. 4 and 5), wherein heat is expelled from the refrigerant. Such a condenser would typically consist of finned tubing that is available from several manufacturers including Heatron, Energy Transfer, Inc., and Heat Exchange Applied Technology. A fan (FIGS. 4-5) is used to blow air over the condenser coil to enhance heat transfer to the environment through forced conduction. A thin brushless DC motor fan such as the Micronel F-80 equipped with a bridge rectifier and capacitor for AC current operation could be used. Alternatively, a miniature AC fan such as the V-72 from Micronel could be employed.

After refrigerant leaves the condenser, a compressor is used to compress the refrigerant gas back into liquid state. Suitable compressors are available from several manufacturers including Necchi and Matsushita (Panasonic). Necchi makes the Mini-ES series and Matsushita makes a similar line of small compressors.

Capillary tubing is used to control the mass flow rate of refrigerant into the compressor. Capillary tubing is readily available from many sources, including Wolverine Tube, Inc. of Decatur, Ala. For connections between the compressor, condenser, evaporator, and capillary tubing, basic copper tubing such as that available from Wolverine Tube, Inc. could be used.

As can also be seen in FIG. 1, the device includes a motor drive tower 11 having a motor 13 (FIG. 4). Motor 13 is connected via a drive arm 15 to a mixing shaft 17. An operator provides instructions to the device by way of buttons on control panels 19 and 21. A display screen 22, which can be either a Liquid Crystal Display (LCD), or Plasma Gas or another technology, flashes information regarding appliance status, entered data, or information communicated to the device by telephone link. Messages from the device's memory can also be displayed on the display screen for an operator to read.

Figure 3:
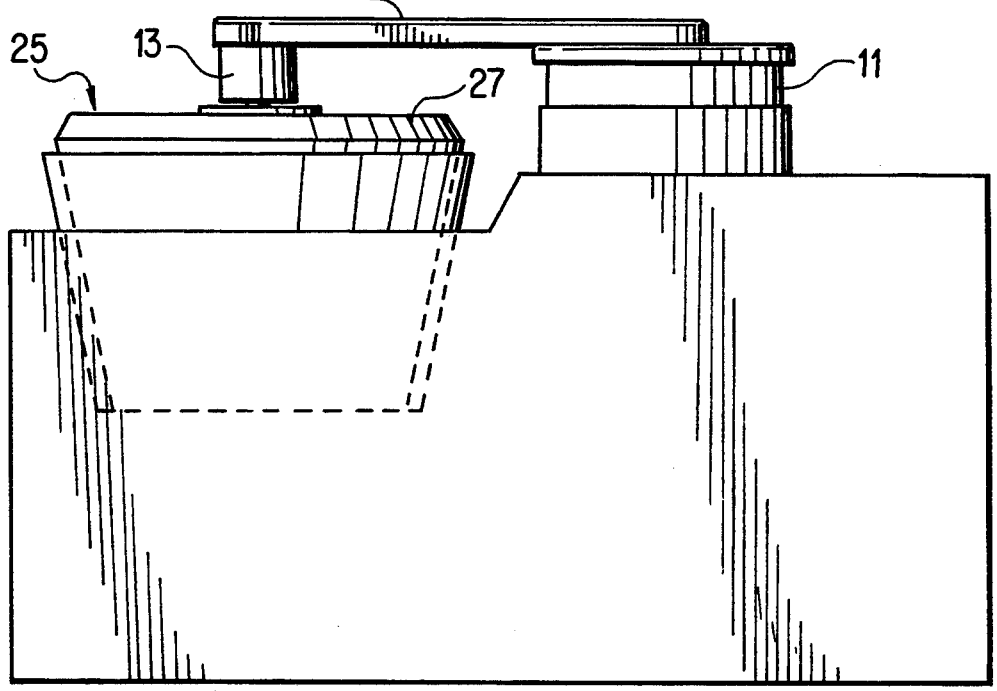
FIG. 3 is a side view of a slightly different embodiment of an automatic food preparation device according to the present invention.

FIG. 3 shows a side view of an automatic food preparation device wherein the motor 13 is not provided within the motor drive tower 11. Instead, motor 13 is provided between power drive arm 15, and the detachable food container 25. This arrangement reduces stress on the power drive arm. It can be appreciated from FIG. 3 that the detachable food container 25 and its lid 27 would be received in a similar fashion within the embodiment shown in FIGS. 1 and 2.

FIG. 4 shows the embodiment of FIGS. 1 and 2 in a schematic cross-section. Motor 13 turns a pulley 30 carrying a belt 32 within power drive arm 15. The belt 32 transfers rotary motion to drive shaft 17 by way of pulley 34. Drive shaft 17, in turn, can rotate a mixing blade 36 mounted thereon. Mounting means 38 secure the mixing blade 36 to drive shaft 17.

FIG. 4 depicts detachable container 25 in its heating position, out of contact with evaporator plate 5 to prevent the adverse effects of heating the refrigerant contained therein. The container 25 is mounted on a heating plate 40, which carries heating elements 42. The heating elements 42 can, for example, be tubular heating elements or high-watt density etched foil heating elements. Attached to heating plate 40 is a sensor 43 for controlling the surface temperature of the heater. Detachable container 25 is secured to heating plate 40 by locking means such as mating grooves and ridges. Thus, container 25 is twist-locked into place on heating plate 40 for added stability.

Mechanical means is provided for raising container 25 to the heating position shown in FIG. 4. In a preferred embodiment of the invention, the mechanical means comprises a motor 44, a rack 46, and a pinion 48. Rack 46 is carried on a column or shaft which supports heating plate 40. When the motor 44 is activated, pinion 48 rotates and engages rack 46 to move the column up or down and thereby shift container 25 between its heating (FIG. 4) and cooling (FIG. 5) positions. As the container is raised or lowered, power drive arm 15 serves to transfer the upward or downward motion to motor 13 and motor-drive tower 11. Thus, as container 25 is lifted, motor drive tower 11 is lifted, and as container 25 is lowered, motor drive tower 11 is lowered as well. This permits operation of mixing blade 36 when the container is in either position. Mixing blade 36 can also be operated while the container is in transit from one position to another.

FIG. 5 shows the container 25 in its cooling position. In this position, the exterior walls of the container are in contact with evaporator plate 5. Accordingly, motor drive tower 11 is shown in its lowered position. It should be noted that the truncated conical shape of detachable container 25 insures an improved contact area between the container and the evaporator plate in this position. Air gaps and ice formation inherent in the prior art are minimized by this design.

FIG. 5 also shows (dotted lines) a dispensing pump 50. The dispensing pump permits single serving size supplies of soft ice cream, yogurt, or the like to be dispensed from container 25 without necessitating removal of lid 27. Hot syrups, gravies, and the like could likewise be dispensed from the pump when the container is in its heating position.

Figure 6:
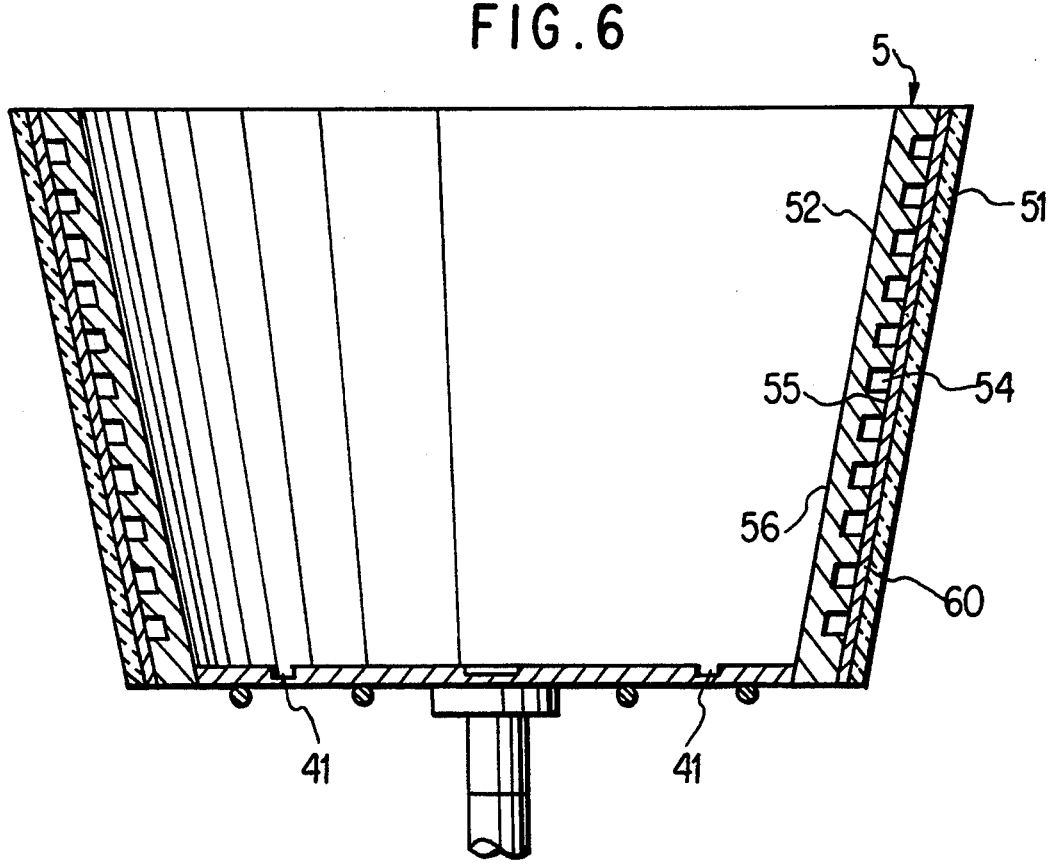
FIG. 6 is a cross-section of an evaporator plate which may be used with the present invention.
Figure 7:
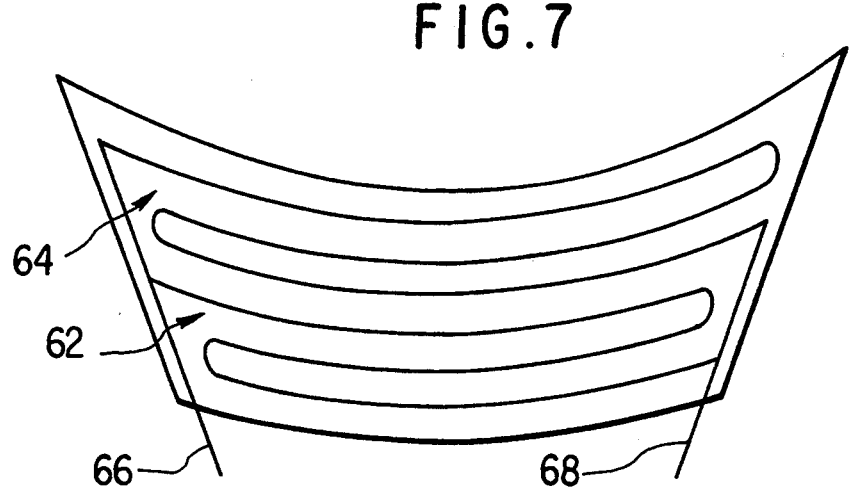
FIG. 7 is a schematic drawing showing one possible refrigerant flow path through the evaporator plate.

FIGS. 6 and 7 show the details of evaporator plate 5. In all previous known detachable container designs, the evaporator coil has been attached to the outer surface of the metal skin of a female cooling well assembly. Only around 25% of the round coil surface actually contacts the metal wall in such an arrangement. Thermal transfer is therefore inefficient. Furthermore, and since the temperature of the flowing refrigerant increases after it evaporates as it flows downstream, it is difficult to achieve a uniform temperature at the top and bottom of the coil in the prior art evaporators.

As shown in FIG. 6, the evaporator plate of the present invention includes two main segments located within an insulating layer 51. The first segment is a machined metal piece 52. Piece 52 is an extruded or cast metal composition having a cylindrical truncated conical shape. The piece 52 may be constructed for example of 6061 aluminum, which is machined or cast with a refrigerant flow groove pattern 54 on its outer wall 55, and bored or cast so that its interior surface 56 is smooth. The second main segment of evaporator plate 5 is a metal sleeve 60 which is placed over the groove pattern 54 of the metal piece 52 to complete flow channels formed by the grooves 54.

Metal sleeve 60 may also be of aluminum construction. When both segments 52 and 60 are of aluminum, attachment of the pieces may be made, for example, by tinning with a fluxless aluminum solder such as Ney 380 by use of an ultrasonic solder bath for later joining in an oven. The piece 52 can be tinned before the machining operations take place. As a means of obtaining a tight fit, the piece 52 is cooled down to cause shrinkage and the sleeve 60 is placed over the grooved pattern. Additionally, tinned tube connectors 66 and 68 (FIG. 7) are connected to the inlet and outlet openings. Heating the evaporator assembly in an oven to the melting point of the solder joins the parts together and creates a bond stronger than the aluminum metal itself. If sufficient ungrooved space is left at the top and bottom, the solder joint will be strong and leak-tight. Tube connectors 66 and 68 can be reinforced with epoxy compounds if desired.

If copper, copper based alloys, or steel alloys are used for the segments 52 and 60, solder paste can be applied to the metal surfaces before joining in an oven. Brazing metals can also be used in the metal joining process. Other methods are available for assembly of the evaporator including vacuum brazing a metal sleeve clad with brazing metal onto the extruded part containing the refrigerant flow channels. For example, automobile air conditioning evaporators and condensers have been assembled for several years using a 4004 aluminum, silicon and magnesium bearing brazing alloy clad to a pure 3003 aluminum core metal. The silicon lowers the melting point of the clad below that of 6061 aluminum and the magnesium flashes at 900° F. and combines with leftover oxygen, stopping oxidation during the furnace vacuum brazing process. Additionally, seam welding the top and bottom of the sleeve 60 onto extruded part 52 is feasible.

Forging the metal piece 52 provides certain advantages over extruding this part. Sharper angles and larger sizes than what is practical using an extrusion fabrication technique is possible. If forging is used, a truncated conical piece of metal is precision forged to the desired angle and wall thickness. After the forging step has been completed, the surface of the metal is smoothed. The flow channel network is then machined into the outer wall. During the machining step, the conical forged part can be tilted at an angle so that the milling bit works along a horizontal surface. With this method of construction, metal sleeve 60 is of the same material as the forged metal, and is manufactured to an identical angle as the forged part. This metal sleeve is bonded over flow channels 54 using the same surface tinning and oven soldering procedure described above for the aluminum extrusion assembly technique. Shrink freezing of the forged part is not required. If the sleeve is slightly shorter than the forged part, or if the forged part is placed on a mandrel, gravity or simple even pressure during the oven heating process will result in a strong solder bond between the sleeve and the forging containing the machine refrigerant flow network 54. A copper or steel weight can be used to apply the pressure during the oven soldering operation. Investment casting, vacuum casting, and die casting and machining methods allow the depth and width of the refrigerant flow-grooves 54 to be adjusted. The thickness of the metal can be reduced by using this process.

As can be seen in FIGS. 4-6, the metal plate 40 can be provided with one or more recessed grooves 41 for receiving locking ridges 141 provided on the base container 25.

FIG. 7 shows one possible arrangement of the flow-channel groove 54. Refrigerant entering the evaporation plate is divided into two different flow sub-circuits 62 and 64 so that more uniform cooling is achieved. Coolant entering through inlet tube 66 flows upward and is divided into the paths 62 and 64. The flow from these sub-circuits then again merges before exiting through exit tube 68. With this structure, the temperatures along path 62 are essentially equal to those along path 64. Furthermore, this design avoids superheating of the refrigerant.

Figure 8:
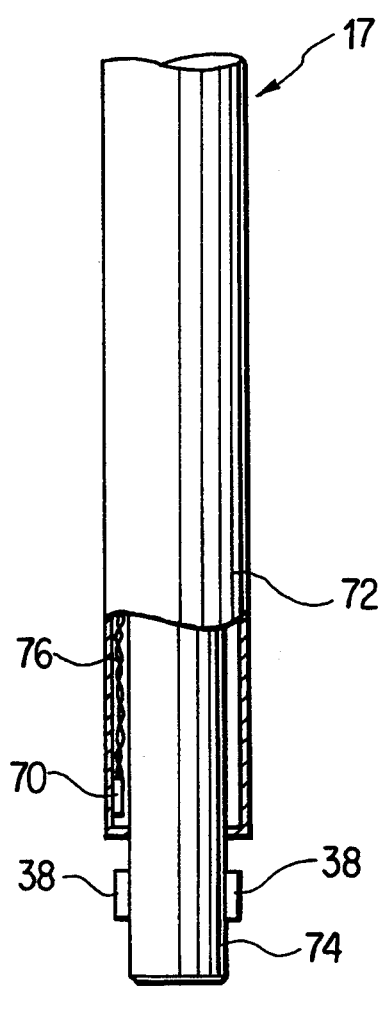
FIGS. 8 and 9 show possible arrangements of a temperature sensor placed within the automatic food preparation device.
Figure 9:
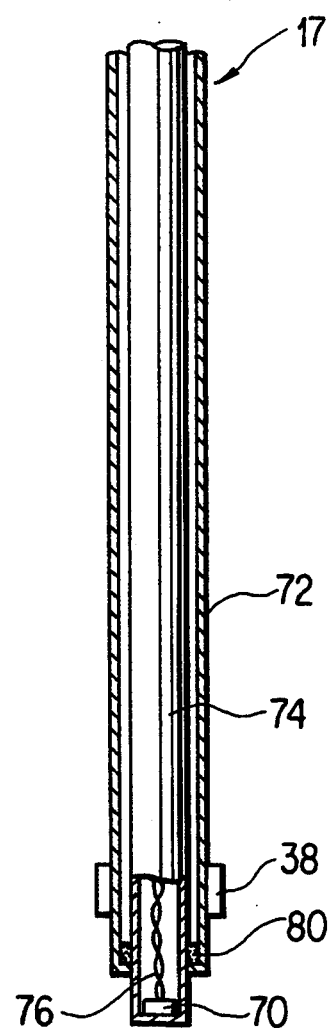

FIGS. 8 and 9 show the details of rotating shaft 17, the mounting structure for blade 36, and a temperature sensor 70.

In FIG. 8, temperature sensor 70 is mounted on a stationary hollow outer shaft 72. The hollow outer shaft 72 receives a rotating inner shaft 74 with adequate clearance so that there is no frictional resistance between the shafts. Wiring 76 leads from temperature sensor 70 to the microcontroller of the device (not shown), and is isolated from rotating shaft 74. The rotating shaft 74 carries locking members 38 for securing mixing blade 36 (see FIGS. 4 and 5) in place.

FIG. 9 shows an alternate embodiment of the shaft 17 wherein the inner portion of the shaft 74 is stationary and the outer portion of the shaft 72 rotates and carries locking means 38. The temperature sensor 70 is mounted at the base of the stationary inner shaft 74 and its wires 76 lead through stationary inner shaft 74. A sealing means 80 is provided to prevent any food product from coming between inner shaft 74 and outer shaft 72.

Figure 10:
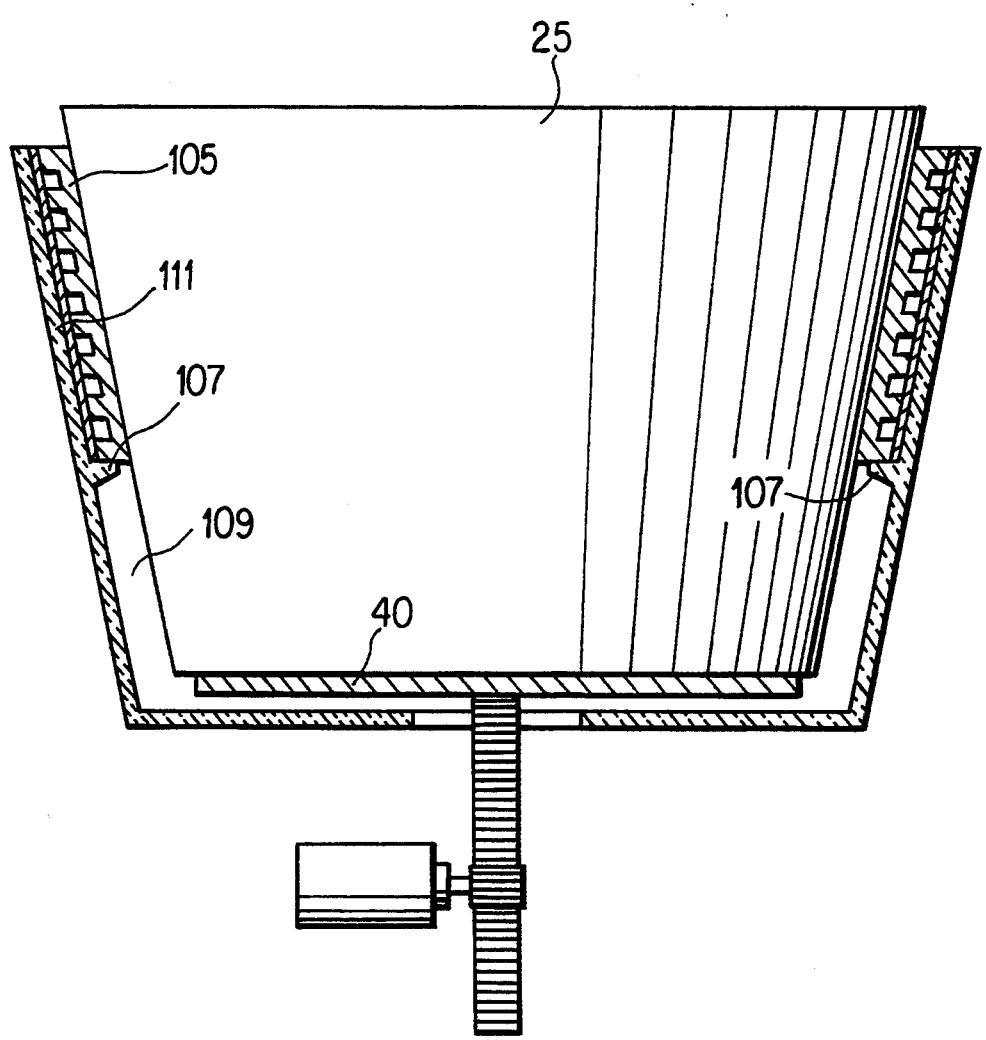
FIG. 10 is a schematic side view of the invention wherein a shortened evaporator assembly is used.

FIG. 10 shows the automatic food preparation device wherein a short evaporator assembly 105 is used in place of the evaporator assembly 5 shown in FIGS. 4-6. By utilizing a refrigeration system evaporator assembly that is shorter in length than detachable container 25, the amount of metal used in the evaporator construction can be reduced. Furthermore, the use of the short evaporator design provides an additional advantage in that it lowers the cost of scaling up the volume capacity of the food processing appliance. The design nonetheless provides adequate cooling because the chilling effect of the evaporator extends below the actual evaporator due to a buoyancy effect. Additionally, the mixing capabilities of the appliance assist in transferring heat from the entire contents of the detachable container 25 to evaporator plate 105.

In the embodiment shown in FIG. 10, evaporator 105 is supported around the upper part of detachable container 25 by a protruding ridge 107. This design minimizes the potential of detachable container 25 to stick in the evaporator assembly after insertion because an air space 109 is provided adjacent a substantial portion of the external surface of detachable container 25. Air space 109 also provides adequate space to receive inlet and outlet tubes conducting refrigerant to and from evaporator assembly 105. A layer of insulation 111 is provided around evaporator assembly 105 and the air space 109, and the insulation also extends beneath heating plate 40. The insulation may be of any suitable variety, although a plastic insulation material is preferred.

Figure 11:
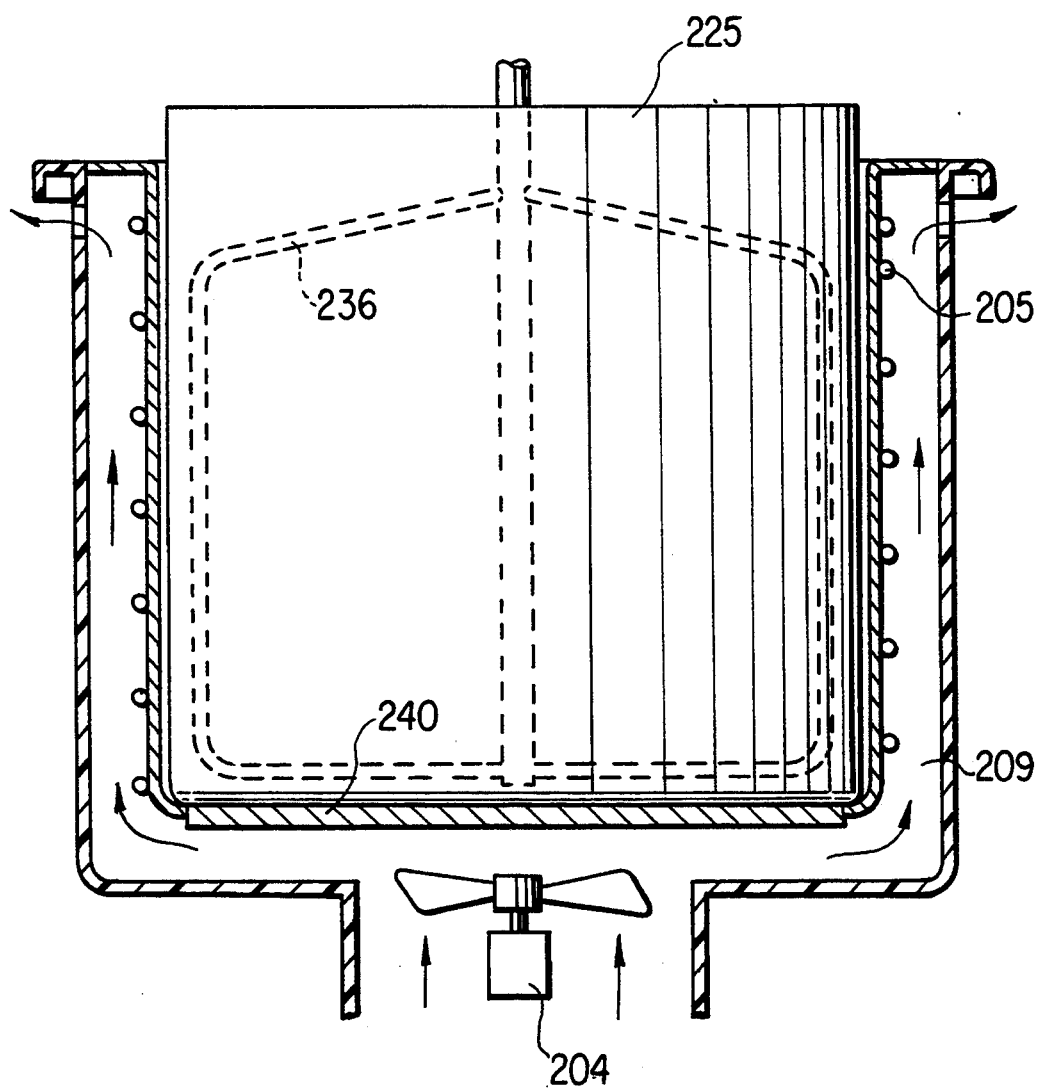
FIG. 11 is an alternate embodiment of the present invention wherein a secondary coolant is used.

FIG. 11 shows an alternative embodiment of the invention wherein an intermediate coolant (single phase) is used for the refrigeration function. Coolants that can be used for this purpose include propylene glycol, ethylene glycol, methanol, sodium chloride, calcium chloride, trichloroethylene, and methylene chloride. These coolants do not vaporize within the refrigeration cycle, and therefore excessive pressures do not build up within an evaporator assembly 205 when the refrigerant is heated. Nonetheless, after heating takes place using a heating plate 240, a precoolant step is desirable to remove heat from container 225 before refrigeration begins. For this purpose, a fan 204 is provided along with an air channel 209 through which ventilating air is forced by the fan. A layer of insulation 211 is provided around evaporator assembly 205 and the air space 209 in a manner similar to that shown in FIG. 10. The precooling step releases heat trapped in the food product mixture that otherwise would have to be removed from the container by the refrigeration system alone. This allows the present invention to make use of smaller, less expensive components, reduces compressor running times and increases refrigeration efficiency. Mixing blade 236 in FIG. 11 operates in much the same way as mixing blade 36 in FIGS. 4 and 5. It should be noted that an intermediate coolant such as methanol or the like could also be used in the embodiment of the invention shown in FIGS. 4 and 5. Likewise, a fan such as fan 204 of FIG. 11 could be provided near the motor 44 in FIGS. 4 and 5 for cooling the removable container 25 before it is lowered into its cooling position.

Additionally, it should be appreciated that apparatus for automatic addition of recipe ingredients could be provided above removable container 25. Detachable container top 27, for example, could have holes located on its surface for accepting matching sized ingredient containers. These ingredient containers could contain either liquids, powders, or solid pieces. Pressure exerted on the ingredient containers could cause trap doors on the containers to open, spilling the contents. Liquid containers could utilize a syringe type design which empties a measured amount of contents when pressure is exerted on the contents of the container by a plunger. The actuator system for the ingredient containers can be located internally in the detachable container top or be external.

A powerful micro-controller consisting of computer chips controls the functions of the automatic food preparation device. These chips can be located, for example in or behind control panels 19 and 21 shown in FIG. 1. A manual mode allows an operator to enter timing, mixing, heating, and chilling instructions by push button. As an additional convenience, a bar-code device can be included which allows an operator the flexibility of entering automatic food preparation instructions from a recipe book or from a premixed product package, bypassing a need to press any buttons. By using a bar-code system, the recipe could be customized beyond the preset or manual entry buttons located on the control panels 19 and 21. Other automatic recipe entry options include storing a recipe book on a memory card or disk and allowing the operator to call up and select a recipe for use with the appliance. Furthermore, the capability can be designed into the appliance to accept recipes down-line from a telephone hookup with an information service. The telephone can also be used as a means for entering operational instructions into the appliance from a remote location.

The following is an explanation of the operating procedure of the food preparation device of the present invention with reference to the embodiment of FIGS. 4 and 5.

Typically, the removable container 25 and its lid 27 would be removed for adding ingredients to the container. The container would then be placed within the receiving space 9 and the power arm 15, rotating shaft 17, mixing blade 36, and container lid 27 would be assembled in place as shown in FIG. 4. The capability of adding recipe ingredients to the detachable container after assembly can be accommodated by using a container lid with a removable section (not shown). Using the control panels 19 and 21, an operator would then program a sequence of chilling, mixing, and heating instructions. Alternatively, the user could select a button corresponding to a preprogrammed set of instructions or load a recipe program into memory by some other means. Preprogrammed buttons on control panel 19 may include recipes for commonly prepared items such as ice cream, pudding, and yogurt. If the user desires storing the ingredients in a heated, refrigerated or frozen state before or after food preparation, this can be programmed as well. The actual sequence of cooling, mixing, and heating is controlled by the micro-processor within the device according to the instructions given by the user. Functions that are controllable include heating and cooling times, temperature, mixing speed and mixing direction. Other functions such as automatic recipe ingredient addition and foodstuff dispensing are also software controllable. The micro-controller would have adequate memory space to store complicated recipe instructions. When cooling is to be performed, detachable container 25 is maintained in its lower position as shown in FIG. 5. The compressor, condenser, and evaporator are actuated to remove heat from the container by circulating refrigerant through the refrigeration cycle. If desired, mixing can take place using blade 36 while refrigeration is being performed. Temperature sensor 70 provides feedback to the micro-controller so that either a mild chilling or hard freezing can be achieved as desired. When heating to a temperature above room temperature is desired, heating elements 42 are activated, and the container 25 is raised to the heating position shown in FIG. 4. To prevent a large amount of moisture from freezing on evaporator plate 5 once heating has begun, it may be desirable to program the micro-controller to warm the evaporator plate to room temperature or slightly warmer before the container is raised. Once in the heating mode, temperature sensor 70 again provides feedback to the micro-controller so that a desired temperature can be maintained. Mixing blade 36 may also be activated during the heating mode. Once food preparation is complete, the device is capable of holding the prepared dish at any desired temperature, and it will do so automatically if such a step was programmed with the preparation instructions. For soft, frozen desserts such as ice cream, custard, or yogurt, the optional dispensing pump 50 can be installed for dispensing the food product directly from food container 25. Hot syrups, gravies, and the like could be dispensed in a similar manner from the device when it is in its heating position.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An automated food preparation device comprising:
   a housing;
   a container engageable with said housing and adapted to contain a food product;
   means in said housing for cooling said container, whereby a food product therein is cooled;
   means in said housing for heating said container, whereby a food product therein is heated;
   means associated with said housing for mixing a food product in said container; and
   means in said housing for automatically actuating at least one of said cooling, heating, or mixing means, whereby the food product may be automatically processed in said container;
   wherein said means for cooling said container includes a refrigerator circuit having an evaporator plate.

2. A food preparation device as recited in claim 1, wherein said evaporation plate includes an internal refrigerant flow channel.

3. A food preparation device as recited in claim 2, wherein said evaporation plate is in direct contact with substantially the entire length of an external side of said container when said container is engaged with the housing.

4. A food preparation device as recited in claim 2, wherein said evaporation plate is in contact with only an upper portion of an external side of said container when said container is engaged with the housing.

5. A food preparation device as recited in claim 2, wherein said channel is bounded on an inner side by a metal piece and wherein said channel is bounded on an outer side by a metal sleeve.

6. A food preparation device as recited in claim 5, wherein said metal piece is soldered to said metal sleeve to form said channel.

7. A food preparation device as recited in claim 1, wherein said means for heating said container includes a metal plate with at least one heating element and wherein said container includes a base having locking ridges and said metal plate includes recessed grooves for interlocking with said locking ridges of said base.

8. An automated food preparation device comprising:
   a housing;
   a container engageable with said housing and adapted to contain a food product;
   means in said housing for cooling said container, whereby a food product therein is cooled;
   means in said housing for heating said container, whereby a food product therein is heated;
   means associated with said housing for mixing a food product in said container; and
   means in said housing for automatically actuating at least one of said cooling, heating, or mixing means, whereby the food product may be automatically processed in said container;

wherein said device further comprises mechanical means for moving said container to a first position for cooling said container and to a second position for heating said container.

9. A food preparation device as recited in claim 8, wherein said mechanical means comprises a motor driven rack and pinion system.

10. A food preparation device as recited in claim 8, wherein said means for mixing includes at least one blade mounted on a rotatable shaft.

11. A food preparation device as recited in claim 10, wherein said at least one blade is driven by a motor coupled to said rotatable shaft.

12. A food preparation device as recited in claim 11, wherein said shaft, said motor, and said container are moved in unison by said mechanical means into a first position permitting mixing while said cooling means cools said container, and wherein said shaft, said motor, and said container are moved in unison to a second position permitting mixing while said heating means heats said container.

13. A food preparation device as recited in claim 11, wherein said shaft, said motor, and said container are mounted so as to be movable in unison between said first position for cooling said container and said second position for heating said container.

14. A food preparation device as recited in claim 12, wherein said at least one blade is engageable for mixing contents of said container both during cooling and heating of the container.

15. An automated food preparation device comprising:
a housing;
a container engageable with said housing and adapted to contain a food product;
means in said housing for cooling said container, whereby a food product therein is cooled;
means in said housing for heating said container, whereby a food product therein is heated;
means associated with said housing for mixing a food product in said container; and
means in said housing for automatically actuating at least one of said cooling, heating, or mixing means, whereby the food product may be automatically processed in said container;
wherein said means for cooling said container includes a refrigeration circuit having a cooling plate and means for receiving an intermediate coolant within said cooling plate.

16. A food preparation device as recited in claim 15, wherein the intermediate coolant is methanol.

17. A food preparation device as recited in claim 15, wherein a fan is provided beneath the container to dissipate heat after the container is heated.

18. An automated food preparation device comprising:
a housing;
a container engageable with said housing and adapted to contain a food product;
means in said housing for cooling said container, whereby a food product therein is cooled;
means in said housing for heating said container, whereby a food product therein is heated;
means associated with said housing for mixing a food product in said container; and
means in said housing for automatically actuating at least one of said cooling, heating, or mixing means, whereby the food product may be automatically processed in said container;
wherein said means for mixing includes at least one blade mounted on a rotatable shaft, and wherein said rotatable shaft is surrounded by a stationary hollow outer shaft carrying a temperature sensor thereon.

19. An automated food preparation device comprising:
a housing;
a container engageable with said housing and adapted to contain a food product;
means in said housing for cooling said container, whereby a food product therein is cooled;
means in said housing for heating said container, whereby a food product therein is heated;
means associated with said housing for mixing a food product in said container; and
means in said housing for automatically actuating at least one of said cooling, heating, or mixing means, whereby the food product may be automatically processed in said container;
wherein said means for mixing includes at least one blade mounted on a rotatable shaft, and wherein said rotatable shaft is hollow, said rotatable shaft surrounding a stationary inner shaft carrying a temperature sensor thereon.

20. An automated food preparation device, comprising:
a housing;
a detachable container receivable within said housing;
a refrigeration circuit within said housing for removing heat from said detachable container, said refrigeration circuit including a cold plate contactable with a surface of said container to remove heat from said container;
at least one heating member within said housing for adding heat to said detachable container;
a programmable control means for controlling the operation of said refrigeration circuit and said heating member to produce a desired sequence of temperatures within said detachable container;
a mixing blade receivable within said detachable container; and
means for rotating said mixing blade responsive to control commands from said programmable control means.

21. An automated food preparation device according to claim 20, wherein said refrigeration circuit is selected from the group consisting of a thermoelectric refrigeration circuit, a Stirling cycle refrigeration circuit, an absorption refrigeration circuit, a propane refrigeration circuit, and a thermoacoustic refrigeration circuit.

22. An automated food preparation device for preparing food according to a series of programmed heating and cooling steps, comprising:
a heating member for detachably receiving a detachable food container,
a refrigeration circuit including an evaporator plate,
mechanical means for moving said container to a first position wherein an external surface of the container is in contact with said evaporator plate, said mechanical means also for moving said container into a second position wherein a ventilating air space is created between said container and the evaporator assembly; and controller means for activating said refrigeration circuit when said container is in said first position and for activating said heating member when said container is in said second position.

23. A food preparation device, comprising:
a housing;
a container adapted to receive and to hold a food product;
cooling means in said housing operable for cooling said food product in said container;
heating means in said housing operable for heating said food product in said container;
mixing means in said housing operable for mixing said food product in said container;
inhibiting means in said housing operable for inhibiting the movement of said container during the operation of said mixing means, and
actuating means in said housing operatively connected to said cooling, heating and mixing means, and operable for automatically actuating at least one of said cooling, heating or mixing means;
whereby, said food product is automatically processed in said container.

24. The food preparation device as claimed in claim 23, wherein said actuating means includes programming means operable to be programmed and said cooling means comprises a refrigeration circuit operable for being controlled by said programming means according to predetermined instructions.

25. The food preparation device as claimed in claim 23, wherein said actuating means includes programming means operable to be programmed, and said cooling means comprises a refrigeration circuit capable of having its operating temperature changed, having its refrigerating operation start, or time period of refrigerating operation controlled by said programming means according to predetermined instructions.

26. A food preparation device, comprising:
a housing;
a container adapted to receive and to hold a food product;
cooling means in said housing operable for cooling said food product in said container; said cooling means comprising a refrigeration circuit including an evaporation plate;
heating means in said housing operable for heating said food product in said container;
mixing means in said housing operable for mixing said food product in said container;
inhibiting means in said housing operable for inhibiting the movement of said container during the operation of said mixing means, and
actuating means in said housing operable for automatically actuating at least one of said cooling, heating or mixing means;
whereby, said food product is automatically processed in said container.

27. A food preparation device, comprising:
a housing;
a container adapted to receive and to hold a food product;
cooling means in said housing operable for cooling said food product in said container; said cooling means comprising a refrigeration circuit including a cold plate;
heating means in said housing operable for heating said food product in said container;
mixing means in said housing operable for mixing said food product in said container;
inhibiting means in said housing operable for inhibiting the movement of said container during the operation of said mixing means, and
actuating means in said housing operable for automatically actuating at least one of said cooling, heating or mixing means;
whereby, said food product is automatically processed in said container.

28. A food preparation device, comprising:
a housing;
a container adapted to receive and to hold a food product;
cooling means in said housing operable for cooling said food product in said container;
heating means in said housing operable for heating said food product in said container;
mixing means in said housing operable for mixing said food product in said container;
inhibiting means in said housing operable for inhibiting the movement of said container during the operation of said mixing means, and
actuating means in said housing operable for automatically actuating at least one of said cooling, heating or mixing means; said actuating means including programming means operable for selectively sequencing said cooling, heating or mixing means according to predetermined instructions;
whereby, said food product is automatically processed in said container.

* * * * *

UNITED STATES PATENT AND TRADEMARK OFFICE
CERTIFICATE OF CORRECTION

PATENT NO. : 5,363,746
DATED : November 15, 1994
INVENTOR(S) : Ellis D. Gordon

It is certified that error appears in the above-identified patent and that said Letters Patent is hereby corrected as shown below:

On the title page, in item (76), inventors address should read :

2856 Davenport St., N.W.
Washington, D.C. 20008

Signed and Sealed this

Twenty-eight Day of February, 1995

*Attest:*

BRUCE LEHMAN

*Attesting Officer*  *Commissioner of Patents and Trademarks*